Nov. 18, 1969   W. E. McCOWN ET AL   3,479,172
APPARATUS FOR CONTROLLING GLASS TEMPERATURES
Filed Aug. 22, 1966   4 Sheets-Sheet 1

INVENTORS
William E. McCown,
Robert E. Maltby, Jr.
and Carey M. Allen
BY
Nobbe & Collins
ATTORNEYS

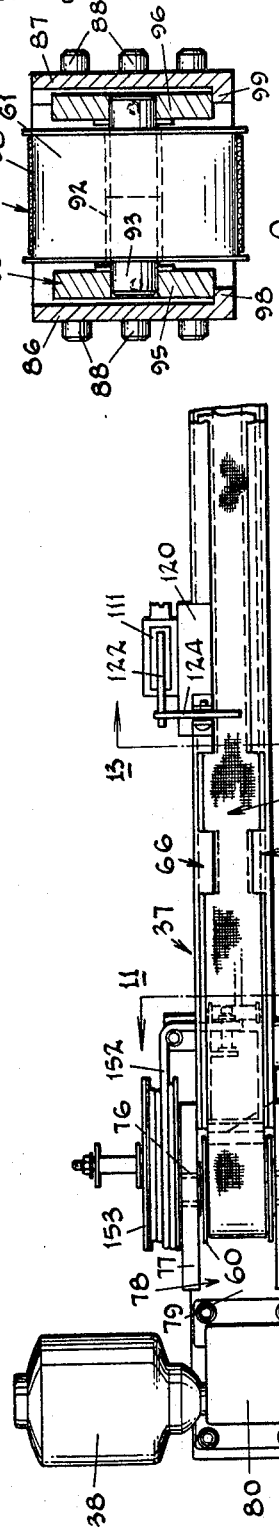

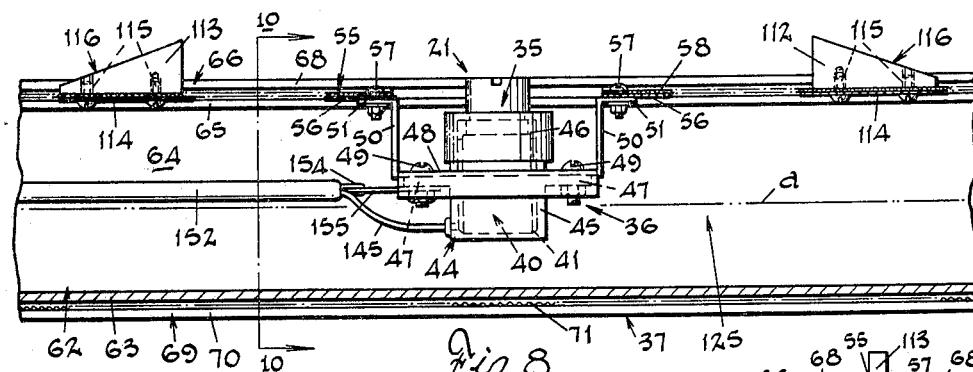
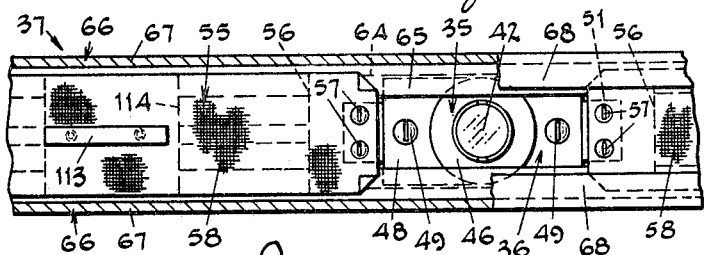
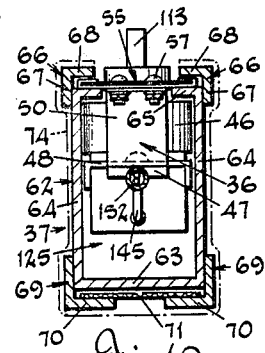
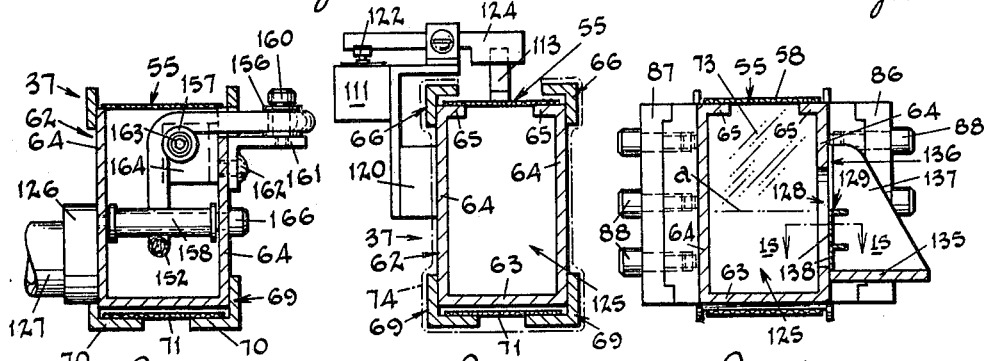
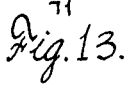
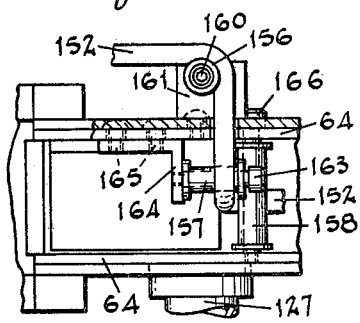
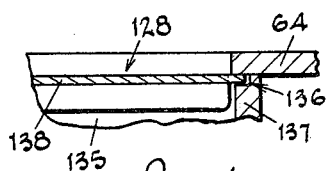

United States Patent Office 3,479,172
Patented Nov. 18, 1969

3,479,172
APPARATUS FOR CONTROLLING GLASS
TEMPERATURES
William E. McCown, Toledo, Robert E. Maltby, Jr.,
Perrysburg, and Carey M. Allen, Toledo, Ohio, assignors to Libbey-Owens-Ford Glass Company, Toledo,
Ohio, a corporation of Ohio
Filed Aug. 22, 1966, Ser. No. 574,035
Int. Cl. C03b 25/04
U.S. Cl. 65—158                    4 Claims

ABSTRACT OF THE DISCLOSURE

Measuring the temperature of a glass sheet as it is conveyed through a lehr. A radiation pyrometer is reciprocated transversely of the sheet along a path parallel to and spaced from the sheet to directly sense its temperature, and the observed temperature profile is transmitted to conventional recording and lehr temperature control apparatus.

---

The present invention relates broadly to treating glass and more particularly to an improved method and apparatus for controlling the permanent strain pattern during the annealing of the glass and temporary strain after annealing.

In the production of plate or sheet glass, it is customary to produce a continuous ribbon of glass from a molten mass and pass the plastic ribbon through an annealing lehr. The primary purposes of passing the ribbon through the lehr are: (1) to cool the glass from a hot plastic condition to an inflexible glass ribbon or sheet at approximately room temperature, (2) to maintain a temperature distribution in the glass while being reduced in temperature in the annealing range of the glass so as to control the permanent strain in the cooled ribbon, and (3) to maintain a temperature distribution in the glass during cooling, from below the annealing range of glass to room temperature, so as to avoid breakage in the lehr.

In the production of glass by the above process, it is desirable to produce a permanent stress pattern transversely of the ribbon or sheet so as to produce compressive stresses near the edges of the ribbon and tensile stresses in the remainder of the ribbon. The strain pattern of a glass ribbon cooled to room temperature depends primarily upon the temperature distribution of the ribbon in the annealing range of glass, which for most commercial glasses is aproximately 900° to 1050° F.

Heretofore, it has been standard practice to control the strain pattern of glass in the annealing zone of a lehr to produce the desired strain pattern in the final room temperature ribbon and to then control the lehr temperature beyond the annealing zone to obtain about the same temperature across the ribbon in these zones as in the annealing zone thereby preventing ribbon cross breaks or longitudinal splits commonly referred to as "snakes." Inasmuch as small temperature differentials cause large variations in stresses, the temperatures must be very accurately controlled.

One method of determining the temperature in the annealing zone of a lehr has been to record the air temperature adjacent the surface of glass with thermocouples and thereby determine the surface temperature of the sheet or ribbon to predict the strain pattern in the room temperature ribbon. However, this has not proven entirely satisfactory in that the temperature of the sheet surface may vary considerably from the air temperature adjacent the surface. It has been determined that the temperature difference between the surface of the sheet and the air temperature surrounding the sheet may be as much as 50° F. This, of course, could result in a large error in determining the strain pattern of the glass, since in most commercial glass compositions, a 1° temperature differential will produce a stress differential of approximately 50 p.s.i.

The inability to accurately predict and control the strain pattern can result in considerable breakage losses in the lehr during cooling of the glass, in cutting the glass after annealing and in various other production steps required in many operations. In addition, large sheets of finished glass are used for modern commercial blazings. These are often almost total ribbon width thereby retaining strain patterns similar to those formed in the annealing zones of the lehr.

The primary object of this invention therefore is to control the strain pattern in a glass sheet during annealing, by accurately controlling the temperature surrounding the sheet during cooling in the annealing temperature range of the glass.

Another object is to accurately measure the temperature of the glass surface transversely of the glass ribbon and regulate the heat supplied to the sheet in the annealing temperature range of the glass, to thereby produce a desired strain pattern in the glass.

A further object is to provide improved apparatus for controlling the strain pattern in a glass ribbon by accurately measuring the temperature differential transversely of the ribbon in the annealing range of the glass.

A still further object is to provide improved apparatus for accurately measuring the temperature of a glass ribbon in the annealing range of the glass by using radiation sensing apparatus which will measure the glass temperature without direct contact with the glass surface.

Other objects and advantages of the invention will become more apparent during the course of the following description when read in connection with the accompanying drawings.

In the drawings, wherein like numerals are employed to designate like parts throughout the same:

FIG. 3 is an enlarged fragmentary plan view of the temperature sensing apparatus constructed in accordance with the invention;

FIG. 4 is a fragmentary view similar to FIG. 3 showing the central portion of the temperature sensing apparatus;

FIG. 5 is a fragmentary plan view similar to FIG. 3 of the opposite end of the sensing apparatus;

FIG. 6 is a fragmentary side elevational view of the apparatus shown in FIG. 3;

FIG. 7 is a fragmentary side elevational view partially in section, of the apparatus shown in FIG. 5;

FIG. 8 is an enlarged vertical sectional view taken along line 8—8 of FIG. 4;

FIG. 9 is a plan view partially in section of the temperature sensing apparatus;

FIG. 10 is an end view of the apparatus shown in FIG. 9;

FIG. 11 is a transverse sectional view taken along line 11—11 of FIG. 3;

FIG. 12 is a fragmentary plan view partially in section of the apparatus shown in FIG. 11;

FIG. 13 is a vertical sectional view taken along line 13—13 of FIG. 3;

FIG. 14 is a sectional view taken along line 14—14 of FIG. 7;

FIG. 15 is a fragmentary sectional view taken along line 15—15 of FIG. 14;

FIG. 16 is a sectional view taken along line 16—16 of FIG. 7; and

Although the apparatus constructed in accordance with this invention will be specifically described in connection with measuring the temperature of glass in the annealing zone of a lehr to control the strain pattern of the finally cooled ribbon, it may also be used for various other purposes in conjunction with like devices operating above the glass ribbon such as predicting the laminar stresses of a glass ribon, predicting the temporary regional stresses in the ribbon while it is cooled from below the annealing range of the glass to room temperature, and measuring and using for control the temperature differential between the top and bottom surfaces of the glass ribbon to minimize or to determine the radius and amount of bow, which will be produced in a glass ribbon while it is cooled from the plastic condition to room temperatures.

Briefly stated, the present invention contemplates controlling the strain pattern, in a continuous glass ribbon, by accurately measuring the temperature transversely of the ribbon in the lehr range, or more particularly the temperature differential transversely of the ribbon and thereafter regulating the amount of heat supplied to the lehr to control the stresses produced in the ribbon during the cooling process.

Figure 1:
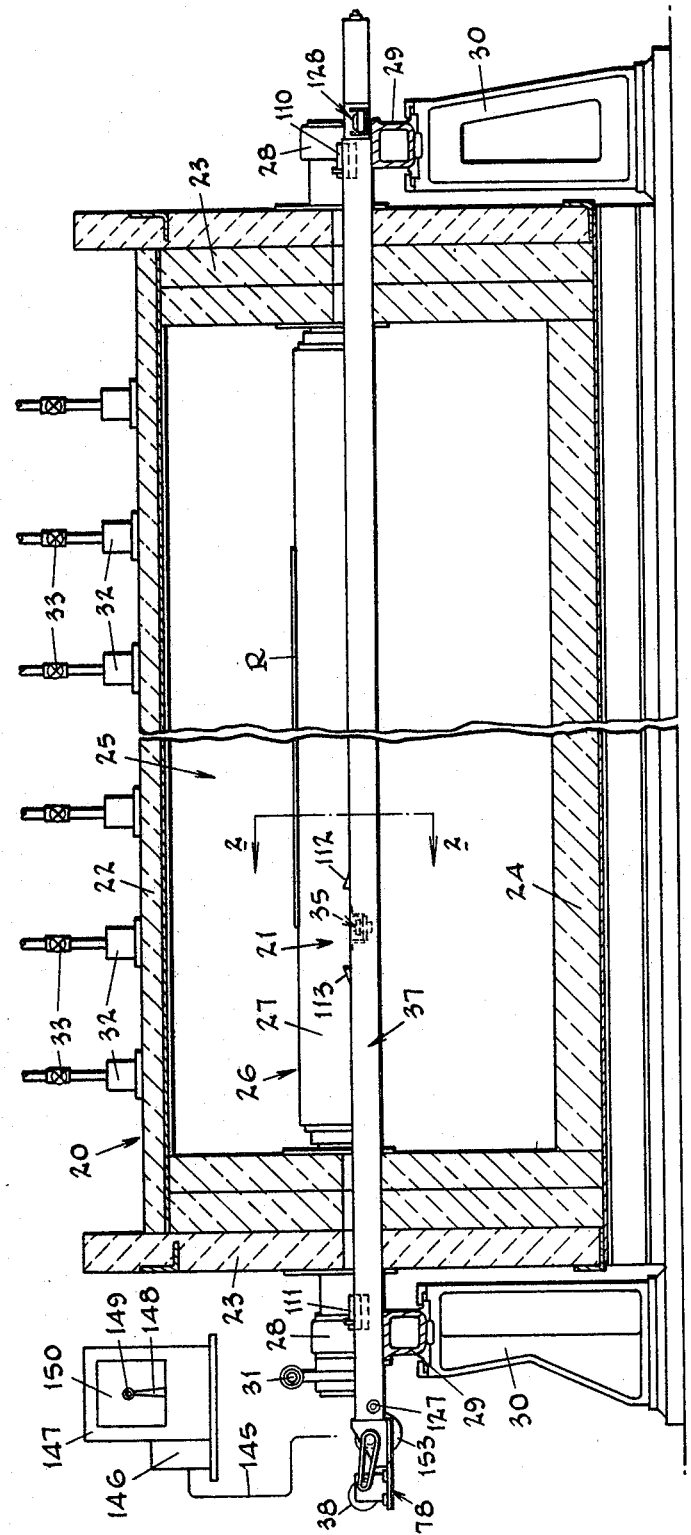
FIG. 1 is a transverse vertical sectional view of an annealing lehr having the features of the present invention incorporated therein.

With particular reference now to FIG. 1 of the drawings, there is illustrated a lehr 20 having the improved temperature sensing apparatus 21, constructed in accordance with the invention, incorporated therein. The lehr 20 includes a top wall 22, side walls 23 and a bottom wall 24, all of which are formed of a heat insulating material to insulate the chamber 25 from the surrounding atmosphere. The lehr includes a conveyor system 26 comprising a plurality of longitudinally spaced rolls 27 extending transversely of the lehr and having their opposite ends projecting through the side walls 23 and received in bearings 28 supported on structural members 29, which are mounted in spaced relation above the floor by pedestals 30. The conveyor rolls are driven in common by a gear drive 31 from a power source (not shown) to move a glass ribbon or sheet R through the lehr.

In the commercial production of glass sheet, glass batch materials are introduced into a tank furnace and reduced to a molten mass. The molten glass then flows through a refining zone or chamber and thereafter may be passed between forming rolls, as in plate or patterned glass processes; drawn, as in the sheet glass process, or formed on a bath of molten tin as in the float glass process, to produce a continuous glass ribbon of desired thickness. The glass, immediately after being formed into a continuous ribbon, is in a highly plastic condition and must be cooled to room temperature while passing through a lehr. As the ribbon passes from the highly plastic condition to a substantially inflexible glass condition, permanent stresses may be produced in the glass as it is being cooled to room temperature and particularly in the temperature range of approximately 1050° to 900° F., which is the approximate annealing range for most commercial glass compositions.

In order to accurately control the reduction in temperature of the glass ribbon, from the plastic condition to room temperature, the lehr is preferably heated by heating means such as gas burners 32, electric radiant heaters, or a combination thereof. The amount of gas supplied to the burners may be controlled by any suitable means, such as individual valves 33, to produce a desired heating pattern longitudinally as well as transversely of the lehr. Thus, in a commercial annealing process, the temperature longitudinally of the lehr is progressively decreased from a range above annealing (1100° to 1500° F.) down to room temperature.

As stated above, the permanent stresses remaining in the glass sheet are dependent upon the transverse, as well as longitudinal, temperature of the lehr in the temperature range of 1050° to 900° F. Furthermore, it is important to accurately control the temperature throughout the cooling process in the lehr to thereby control the temporary regional strains, which may occur in the ribbon after it has been cooled below the annealing range of the glass and before it reaches room temperature.

According to the invention, the permanent strain remaining in the glass after being cooled to room temperature, is controlled by accurately measuring the temperature of the glass in the annealing zone and regulating the amount of heat, as well as the distribution of the heat, supplied to the lehr in this zone to thereby accurately control the strain pattern in the finally cooled glass ribbon.

Figure 2:
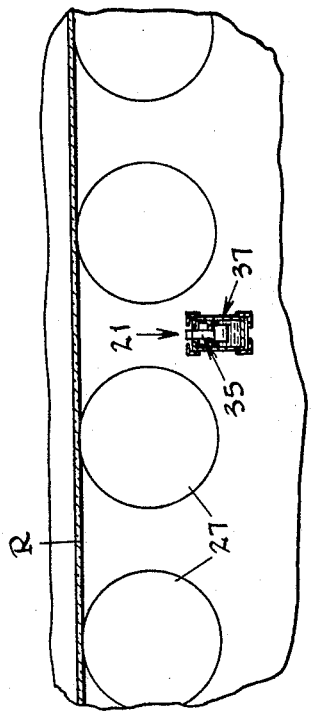
FIG. 2 is an enlarged vertical sectional view taken along line 2—2 of FIG. 1.

Generally stated, a practical embodiment of the temperature sensing apparatus 21 of this invention includes a radiation sensing device 35 (FIG. 8) that is mounted by a carriage member 36 on a support structure, generally designated by the numeral 37, whereby it is adapted to be continuously carried forward and backward in a reciprocal path between the side walls 23 of the lehr. As herein disclosed, as in FIGS. 1 and 2, the support structure 37 is located substantially midway between two of the rolls 26 and at a desired elevation beneath the glass ribbon R to provide for and maintain a predetermined spacing between the radiation sensing device 35 and the ribbon. Also, as viewed in FIG. 1, it will be seen that the respective ends of the support structure 37 are located outwardly of the lehr walls 23 where they are mounted on the structural members 29 and a source of power, such as the motor 38, is mounted on one of these ends for operation of the carriage member 36.

More particularly, the radiation sensing device 35 consists of a radiation pyrometer 40 contained within a casing 41. The pyrometer 40 may be a commercially procured item, such as a Land R G Pyrometer available from Land Pyrometer Ltd., Dronefield, Sheffield, England. The device comprises a filter 42 and a converter (not shown) for converting the thermal radiation energy to electrical potential. The pyrometer casing 41 is bodily received in a housing 44 having a well portion 45 and an upper cap portion 46. The housing 44 is equipped with outwardly directed flanges 47 which are attached to the base 48 of carriage member 36 by means of bolt and nut fastenings 49.

The carriage member 36 is formed with upwardly directed legs 50 having horizontally disposed ends 51 that are connected to the free ends of a traction belt 55. For the purposes of this invention, the belt 55 is formed of a foraminous material, such as flexible stainless steel mesh or screen, which is capable of withstanding the relatively high temperatures within the lehr without undue warping. The free ends of the belt are received on metal clips 56 that are secured on the leg ends 51 by bolt and nut fastenings 57. The described ends of belt 55 constitute the termini of the upper flight 58 of the belt which traverses the top surface of the support structure 37 while the looped end portions thereof are entrained about a drive pulley 60 (FIG. 6) and an idler pulley 61 (FIG. 7) located at the opposite ends of said structure, as will hereinafter be more fully described.

As herein provided and shown in detail, particularly in FIGS. 8, 10, 11 and 14, the support structure 37 includes a main elongated body portion 62 of substantially U-shaped cross-section having a lower wall 63 and with the upper ends of the opposed side walls 64 being bent inwardly to afford flange-like track surfaces 65 for the belt 55. Suitable belt retaining elements 66 are employed in connection with the tracks 65 and may be formed by angular members having the vertically disposed sections 67 secured to the walls 64 and with the horizontal sections 68 thereof thus arranged in upwardly disposed relation above the track surfaces 65. Likewise, angular members 69 are located along the bottom corners of walls 63 and 64 to provide, by the horizontal sections 70, support tracks for the return flight 71 of the belt. As best seen in FIGS. 6 and 7, the ends of the U-shaped structural body 62 are closed by the oppositely disposed walls 72 and 73.

Due to the conventional or necessitated use of metallic elements to construct the support structure 37, such as is illustratively shown, it is realized that the structure will be bodily susceptible to absorption of appreciable amounts of heat within the lehr and consequently will conduct the same to the cooling fluid passing therethrough. This will of course have an adverse effect upon the intended cooling influence of the fluid to maintain the pyrometer device 35 at a substantially constant temperature. Therefore, it has been found desirable to enclose the major portion of the body 62 of the support structure with a suitable insulation material, such as refractory fibers, to provide a protective outer layer as indicated in broken line by the numeral 74 in FIGS. 10 and 13. Conversely, the layer of insulation operates to prevent adverse lowering of the lehr temperature due to radiation of the cooling effect of the water from the walls of the structural body 62.

With regard to drive pulley 60, it will be noted in FIGS. 3 and 6 that the same is suitably fixed on a shaft 75 which is journaled at its ends in sleeve bearings 76 located in vertical walls 77 of a motor platform 78; the base 79 and walls 77 being structurally united with the walls 63 and 64 of the support structure body 62. The aforementioned motor 38 is associated with a reduction unit 80 on the platform base 79 and having an output shaft 81 equipped with a sprocket 82. By means of sprocket chain belt 83, sprocket 82 is adapted to operatively drive a related sprocket 84 keyed on one end of shaft 75. In this connection, it has been previously indicated that the motor 38 is of the reversibly operable type such that through the use of conventional control devices, such as electric limit switches, the drive pulley 60 can be alternately operated to move the sensing device 35 forwardly and rearwardly between the side walls 23 of the lehr.

The idler pulley 61, as seen in FIGS. 5, 7 and 16, is mounted to operate as a tensioning member to adjustably maintain the desired degree of tautness in the respective upper and lower flights of the belt 55. For this purpose, support walls 86 and 87 are secured by bolts 88 to the ends of the walls 64 of the support structure body 62 and the pulley is mounted therein by a yoke 90, said walls 86 and 87 being interjoined at their opposite ends by a wall 91. More particularly, the pulley is rotatably supported by a sleeve bearings 92 on a shaft 93 which at its ends is stationarily mounted in the walls 95 and 96 of the yoke 90 having a cross wall 97 therebetween. As viewed in FIG. 16, the yoke is slidably supported by ledges 98 and 99 integrally formed with the walls 86 and 87 along their lower margins and on which the walls 96 and 97 rest. The yoke is moved along the ledges to adjust the tautness of the belt 55 by means of a coil spring 101 having one end engaged by an eye in lug 102 of the wall 97 and its opposite end similarly engaged in the end of a threaded rod 103 passing through wall 91. By means of a nut 104 turned along the rod 103 in abutting contact with the wall 91, the contracting characteristics of the spring can be varied to control the condition of the belt 55.

As herein provided, the reciprocal movements of the belt are controlled by electric limit switches 110 and 111 that are located adjacent the opposite ends of the support structure 37 and adapted to be alternately engaged by actuator blocks 112 and 113. As seen in FIGS. 4 and 8, these blocks are each mounted on the belt 55, in substantially equally spaced relation from the sensing device 35, by means of a support plate 114 and screws 115 passed through the plate and belt and into the respective block. Each block is formed with a cam or inclined upper surface 116 to effect operation of the associated switch.

As shown in FIG. 13, the switches, either identified by the numeral 110 or 111, are similarly mounted by bracket 120 on a wall 64 of the structure body 62 and are equipped with a leaf spring actuator lever 121 or 122. An arm 123 or 124, as the case may be, pivotally carried by the bracket 120 is adapted, when engaged at one or its inner end by an actuator block, to engage and depress the associated lever 121 or 122 thereby closing the switch thereof.

Accordingly, when the sensing device 35 has been carried forwardly, as toward the right in FIG. 1, and approaches the intended terminus of its movement, the block 112 will engage the arm 123 thereby causing lever 121 to activate the associated switch 110. This will affect the polarity of motor 38 to the end that the drive pulley 60 will be reversibly operated to move the belt 55 and device 35 rearwardly as in a leftward direction in FIG. 1. Then, at the opposite terminus in the reciprocal movements of the sensing device, the block 113 will engage and influence the arm 124 to depress the lever 122 associated with the limit switch 111.

It is, of course, important that the sensing device be maintained at a substantially constant temperature at all times, so that the readings will accurately reflect an indication of the temperature of the glass surface. For this purpose, the side walls 64 and the walls 72 and 73 at the opposite ends of the body 62 of the support structure 37 (FIGS. 6 and 7) form an enclosed trough 125 having an inlet opening or fitting 126 connected to a fluid supply (not shown), such as water, through a conduit 127. One wall 64 at opposite end of the structure body 62 is provided with an outlet opening 128 to allow the fluid to pass through the trough and drain out of the opening.

A desired quantity of water within the trough to continuously immerse the housing 44 is maintained by controlling the height of the contained fluid. This is achieved by determining the lower portion or edge level 129 of the opening 128 and locating the same at a desired distance above the bottom wall 63 of the body portion 62. In the illustrated embodiment, a U-shaped member or chute 135 is secured to the associated wall 64 of the body 62 and slots 136 (FIGS. 14 and 15) are formed in the walls 137 of the chute adjacent the surface of the said wall 64. A plurality of plates or weirs 138 are placed in the slots 136 to determine the elevation of the level 129 of the opening 128 and thus readily establish the level of the water within the trough by the selection of the proper number and vertical height of the weirs. The water level, indicated by the letter a in FIG. 8, in the trough can thereby be varied to determine the depth of immersion of the pyrometer device 35 in the cooling fluid.

The output signal produced by the pyrometer device 35 is passed through a wire 145 to any suitable actuating device for a recording or valve operating apparatus. In the illustrative embodiment, the recording apparatus includes an amplifier 146 (FIG. 1) and a strip chart recorder 147 having a recording arm 148 provided with a pen 149 so that a record of the signal is made on the paper ribbon 150 of the recorder. The wire 145 is preferably carried within a flexible tubing or conduit 152 (FIGS. 3 and 8), which has one end wound upon a spring-biased drum 153 and the opposite end connected to the carriage member 36. To eliminate any tension on the wire 145, it is desirable to also provide a cable 154 within the tubing 152, having one end connected to the carriage 36 as by a link 155 and the opposite end connected to the drum 153.

As herein provided, the tubing 152 is guided from the drum 153 to the line of a prescribed path within the trough 125 by guide sleeves 156, 157 and 158 located at the end of the support structure adjoining the drum 153. As shown in FIGS. 3, 11 and 12, the first guide sleeve 156 is journaled on a bolt 160 secured in a bracket 161 carried by screws 162 on an adjacent wall 64. The tubing is thereby fed from the drum along a path parallel to the wall 64 and bent about the sleeve 156 into a transverse path in which it is trained about the second guide sleeve 157. This sleeve is journaled on a bolt 163 threaded into a bracket 164 mounted by screws 165 on the inner surface of wall 64. From sleeve 157, the tubing is led downwardly and about the third sleeve 158 journaled on bolt 166 mounted in the opposite side walls 64 of the structure 37.

Figure 17:
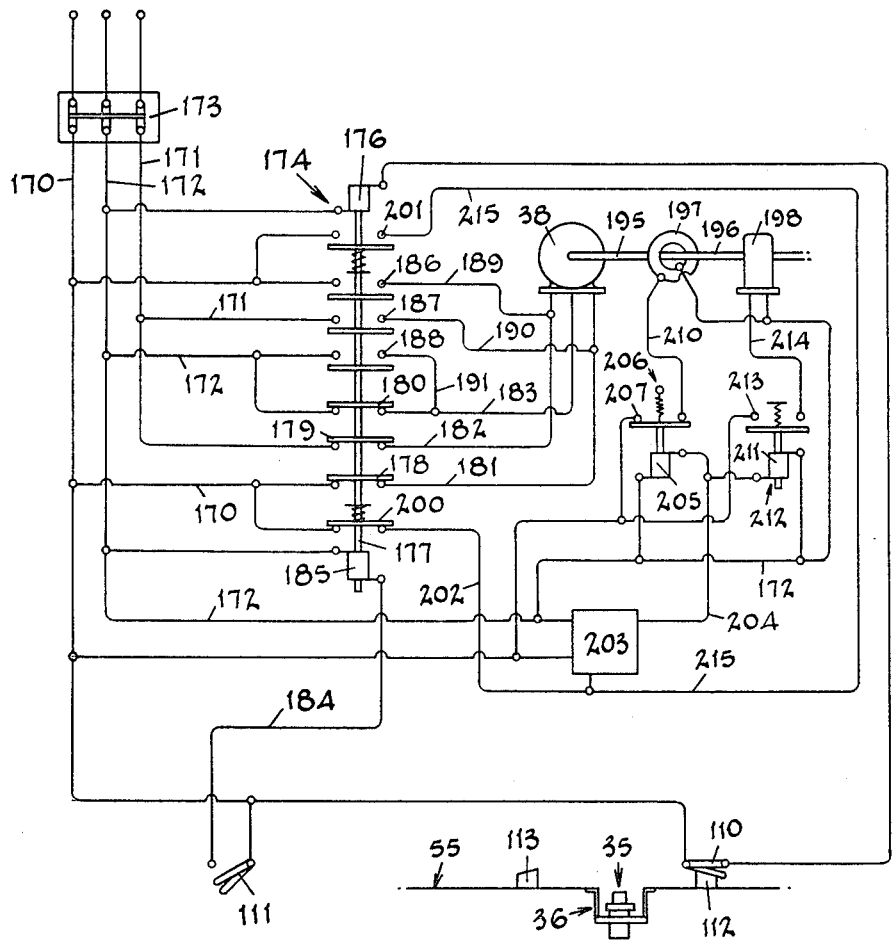
FIG. 17 is a diagrammatic view of a conventional electric control system.

With reference now to FIG. 17, a typical control system for sequentially producing reversal in the polarity of motor 38 is seen to include source lines 170, 171 and 172 that will be completed upon closure of manual switch 173. These source lines are connected through a relay switch (RS) 174 to the motor 38 in accordance with the alternately occurring engagement of limit switches 110 and 111 that are adapted to complete circuits from source line 170. As herein indicated, the belt 55 has been moved forwardly, as hereinabove disclosed in connection with FIG. 1, to cause the actuator block 112 to produce engagement of the spring-biased limit switch 110 thereby completing a circuit by line 175 through the solenoid 176 of R.S. 174 to source line 172. This influenced armature 177 to engage pairs of contacts 178, 179 and 180 whereupon line 170 was completed by line 181 to the motor 38; line 171 similarly by line 182 and line 172 by line 183. During subsequent rearward movement of the sensing device 35 and belt 55 to the opposite terminus of their reciprocal movement, the actuator block 113 will eventually be carried into engagement with the spring-biased limit switch 111. Since the then disengaged condition of switch 110 has de-energized solenoid 176, completion of a circuit from source line 170 by line 184 can be made through solenoid 185 of R.S. 174 to source line 172. While energized, solenoid 185 will activate the armature 177 to disengage contacts 178, 179 and 180 while substantially simultaneously engaging pairs of contacts 186, 187 and 188. This will result in reversal in polarity of motor 38 since line 170 will now connect through contacts 186 to connect to line 182 by line 189; line 171 through contacts 187 to line 181 by way of line 190 and line 172 through contacts 188 to line 183 via line 191. Upon completion of these circuits, the belt 55 will be operated to again carry the sensing device forwardly beneath the glass ribbon. And, when the actuator block 112 again causes engagement of limit switch 110, the solenoid 176 of R.S. 174 will be energized to reverse the circuitry of lines 170, 171 and 172 through R.S. 174. This will produce rearward traversing movement of the sensing device.

Since it may be found advantageous to temporarily disengage the motor 38 from the reduction unit 80 and thereby reduce, if not completely eliminate, structural shock or undue vibration to the sensing device 35 as caused by sudden reversal of the motor, the output motor shaft 195 can be coupled to the input shaft 196 of the reduction unit by an electromagnetic clutch 197. This shaft can be also controlled by a brake unit 198 to temporarily stop rotation of the same. To this end, additional pairs of contacts 200 and 201 are carried by the armature 177 on spring-biased supports in order that either contact pair will "lead" engagement of contact pairs 178, 179 and 180 or 186, 187 and 188. Thus, presently engaged contacts 200 will have completed a circuit from source line 170 by line 202 to timing relay 203; said timer being in series with source lines 170 and 172. This relay is adjusted to monitor a time interval of sufficient length for the belt drive to be halted and the polarity of motor 38 reversed. The timing relay thus is adapted by line 204 to complete a circuit through the solenoid 205 of R.S. 206 which is spring-biased to the closed position of pair of contacts 207. Normally contacts 207 complete a circuit from source 170 by line 210 through the electromagnetic clutch 197 to source line 172, thereby energizing the clutch.

Likewise line 204 is extended through solenoid 211 of R.S. 212 to engage pair of contacts 213 which are normally spring-biased to the open position. While engaged, contacts 213 establish a circuit from source line 170 by line 214 to activate the brake 198 and thence to source line 172.

Thus during reversal of motor 38, the contacts 207 of R.S. 206 will be disengaged and the contacts 213 of R.S. 212 will be engaged thereby uncoupling shaft 195 from shaft 196 at the clutch 197 while stopping rotation of shaft 196 by brake 198. After this short interval, relay 203 "times" out to permit re-engagement of contact pair 207 and simultaneous disengagement of contact pair 213.

As aforementioned, when the actuator block 113 causes closure of limit switch 111 to energize the solenoid 185 of R.S. 174, the armature 177 will be urged to initially produce engagement of contact pair 201 before engaging pairs of contacts 186, 187 and 188. Thus before the circuit lines to motor 38 are reversed, contacts 201 will establish a circuit by line 215 to the timing relay 203 to again activate the same.

We claim:

1. In apparatus for regulating the temperature profile across a glass sheet advancing through an annealing lehr on a series of spaced, horizontally aligned rolls wherein heat is provided by a plurality of individually controlled heating units spaced across said lehr, the improvement comprising a radiation pyrometer mounted adjacent said sheet between a pair of said spaced rolls and directed toward said sheet to observe the temperature thereof, means moving said radiation pyrometer transversely of said sheet in a reciprocating motion along a path spaced from and substantially parallel to said sheet between said pair of rolls to measure the temperature of said sheet across its width, and an actuating means connected to said radiation pyrometer responsive to the measured temperature of said sheet along said path for controlling said individual heating units in response to the actual temperature profile of said sheet.

2. Apparatus as claimed in claim 1, including a trough-like chamber within which said radiation pyrometer moves in said reciprocating motion along said path, and means for circulating a cooling fluid through said chamber to cool said pyrometer.

3. Apparatus as claimed in claim 2, including a layer of insulating material on the outer surface of said trough-like chamber for reducing the amount of heat absorbed from said lehr by said cooling fluid.

4. Apparatus as claimed in claim 2, including means supplying said cooling fluid to one end of said trough-like chamber, means discharging said cooling fluid from the opposite end of said chamber, and a weir in said chamber over which the fluid flows to said discharge means to maintain said liquid at the desired level in said chamber.

References Cited

UNITED STATES PATENTS

| | | | |
|---|---|---|---|
| 1,657,797 | 1/1928 | Henry et al. | 65—162 |
| 1,802,991 | 4/1931 | Wadman | 65—162 XR |
| 1,866,366 | 5/1932 | Mulholland et al. | 65—162 XR |
| 1,880,536 | 10/1932 | Wadman | 65—162 |
| 2,079,566 | 5/1937 | Wadman | 65—162 XR |
| 2,774,190 | 12/1956 | Atkeson | 65—162 XR |
| 3,304,615 | 2/1967 | Ward et al. | |
| 3,010,657 | 11/1961 | Post | 65—162 XR |
| 3,393,868 | 7/1968 | Griem | 65—162 XR |

FRANK W. MIGA, Primary Examiner

U.S. Cl. X.R.

65—29, 118, 162